United States Patent [19]

Normand

[11] 4,069,071
[45] Jan. 17, 1978

[54] METHOD FOR GENERATING A REDUCING ATMOSPHERE FOR HEAT-TREATING INSTALLATIONS

[75] Inventor: Alfred Normand, Paris, France

[73] Assignee: Societe Chimique de la Grande Paroisse, Azote et Produits Chimiques, Paris, France

[21] Appl. No.: 667,983

[22] Filed: Mar. 18, 1976

[30] Foreign Application Priority Data

Apr. 11, 1975 France .............................. 75 11350

[51] Int. Cl.² ............................................. C21D 1/48
[52] U.S. Cl. .................................... 148/16; 148/16.5; 148/16.6; 252/375
[58] Field of Search ...................... 148/16, 16.5, 16.6; 48/61; 252/374, 375

[56] References Cited

U.S. PATENT DOCUMENTS

| 2,606,875 | 8/1952 | Rosenblatt | 252/374 |
| 3,268,371 | 8/1966 | Daubersy | 148/16 |
| 3,399,085 | 8/1968 | Knechtel et al. | 148/16.6 |
| 3,620,518 | 11/1971 | Winter et al. | 148/16 |

FOREIGN PATENT DOCUMENTS

| 473,696 | 10/1937 | United Kingdom | 148/16 |
| 473,697 | 10/1937 | United Kingdom | 148/16 |

Primary Examiner—Walter R. Satterfield
Attorney, Agent, or Firm—Lee C. Robinson, Jr.

[57] ABSTRACT

An atmosphere of nitrogen containing hydrogen is generated by cracking ammonia and recycling a previously generated atmosphere that already had been used. The atmosphere generated by cracking, and the recovered atmosphere that previously had been used, are subjected in a reactor to a catalytic treatment at a temperature between 0° to 600° C and then, after passing through a refrigeration arrangement, the resultant atmosphere is prepared for use. As one example, the atmosphere is adapted to be used as a protective atmosphere for metallurgical heat-treating furnaces.

9 Claims, 1 Drawing Figure

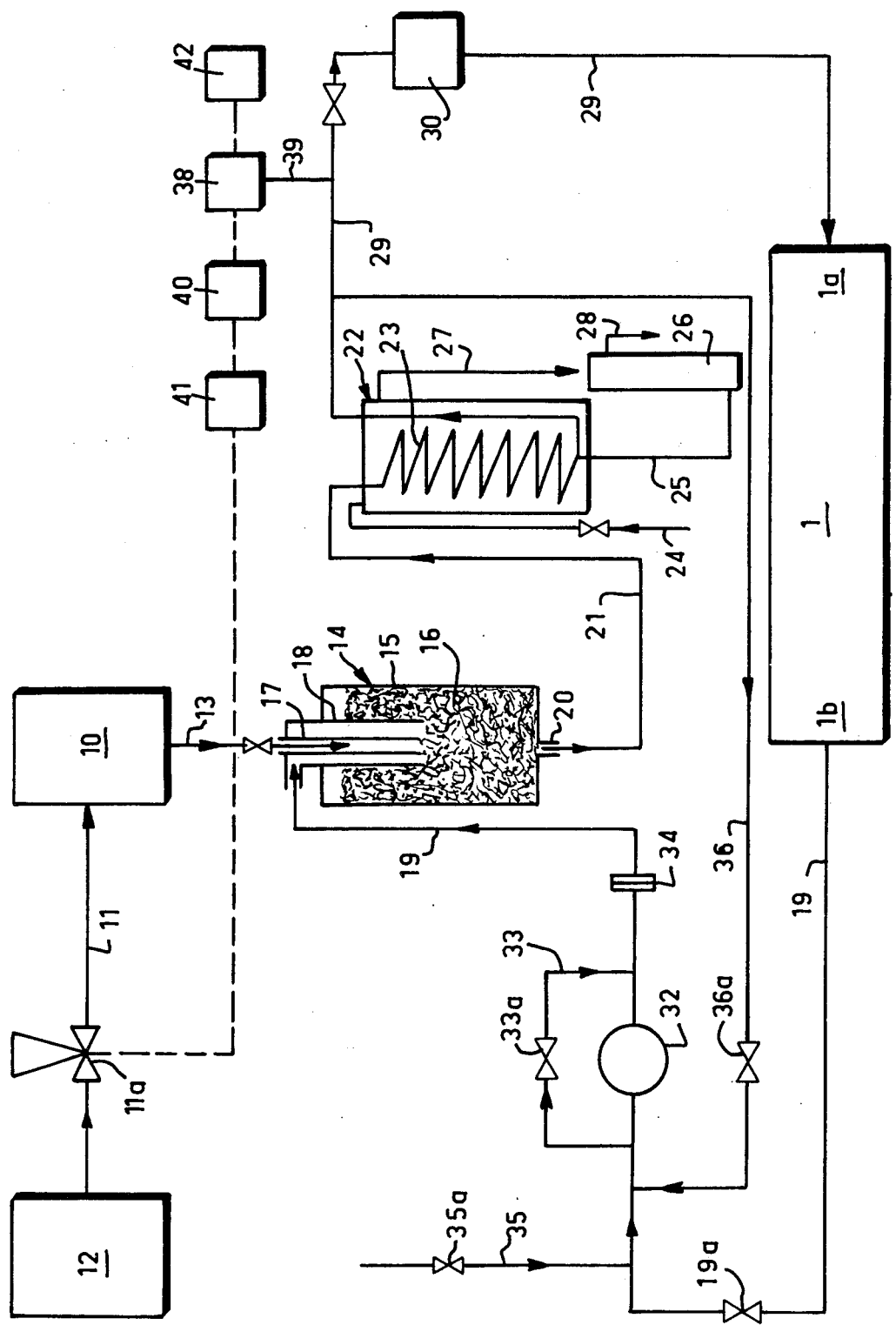

METHOD FOR GENERATING A REDUCING ATMOSPHERE FOR HEAT-TREATING INSTALLATIONS

BACKGROUND OF THE INVENTION

The present invention relates chiefly to the generation of an atmosphere formed at least partly by nitrogen and hydrogen which can be used, as one example, as a protective reducing atmosphere in an heat-treating installation for items such as metals and alloys, and more particularly, wherein the atmosphere is obtained partly by cracking ammonia and partly by recovering the oxygen-contaminated atmosphere which has already passed through the installation.

Methods are known for producing non-oxidizing atmospheres, to be used, for example, in heat-treating operations performed in a metallurgical furnace wherein the non-oxidizing atmosphere after passing through the furnace is recycled for re-use. A method of this type is described in the Specification of French pat. No. 819.373.

One such method employs a regenerative ammonia burner containing a combustion chamber which has a nozzle to which ammonia and primary air are supplied. A coil in which the ammonia is cracked, and a heat-insulated catalysis chamber is contiguous to the combustion chamber and contains a catalyst formed of a number of wire-gauze sheets. The air-contaminated atmosphere emerging from the metallurgical furnace is fed into the catalysis chamber and the nitrogen and hydrogen resulting from the cracking of the ammonia in the combustion chamber, also is fed into the catalysis chamber to provide the additional, fresh gas needed to compensate for losses in the furnace. However, such a catalyst will only operate between 450° and 600° C, that is to say within a relatively narrow temperature range and at a relatively high mean temperature. It is therefore important to hold the wire-gauze sheets within this narrow range if the oxygen contaminant is to be satisfactorily removed. However, the temperature in the catalysis chamber is determined chiefly by the amount of air which infiltrates into the furnace. Where the amount of infiltrating is small the amount of oxygen in the catalysis chamber is decreased, resulting in a lowering its temperature, which has to be compensated for by burning more fresh gas in the combustion chamber. Conversely where the amount of infiltrating air is large the amount of oxygen in the catalysis chamber is increased, thus increasing the temperature in the catalysis chamber, and this increased temperature may be high enough to melt the wire-gauze sheets.

This type of method is rather difficult to carry out. It requires constant surveillance and entails a large number of manual operations to ensure that the apparatus performing this method is properly regulated. In many instances, the difficulties encountered lead to abandon the atmosphere-recycling process and the used atmosphere simply is discharged, rather than re-used. This results in a considerable loss of gas and energy.

OBJECTS OF THE INVENTION

Therefore it is an object of the invention to provide an improved method of generating an atmosphere wherein previously used atmosphere is recycled and which avoids or minimises the disadvantages of previous methods.

Another object of this invention is to provide an improved atmosphere-generating method with substantial savings in the amount of gas and energy that must be used to generate the atmosphere.

A further object of this invention is to provide a method of generating an atmosphere formed at least partly of nitrogen and hydrogen, which atmosphere can be used as a protective reducing atmosphere in, for example, a heat-treatment installation.

An additional object of the present invention is to provide an improved method of generating an atmosphere formed at least partly of nitrogen and hydrogen, wherein previously used oxygen-contaminated atmosphere is recycled by a catalytic de-oxidizing treatment that can be performed over a wide temperature range.

Yet another object of the present invention is to provide an improved method of generating a protective reducing atmosphere wherein a previously used contaminated atmosphere is recycled by a catalytic treatment that can be initiated, that is, started up, at relatively low temperatures, and that can be operated at a relatively low mean temperature.

A still further object of this invention is to provide an improved method of generating a protective reducing atmosphere wherein a previously used atmosphere is recycled by a catalytic reaction which then is cooled and a portion of the resultant atmosphere is fed back to dissipate heat released by the catalytic reaction.

Another object of this invention is to provide a method of generating an atmosphere formed at least partly of nitrogen and hydrogen to be supplied to an installation wherein a catalytic reaction is used in a process of recycling atmosphere emerging from the installation and wherein heat dissipated in the catalytic reaction is dissipated rapidly.

Another object of this invention is to provide a method of generating an atmosphere formed at least partly of nitrogen and hydrogen by cracking ammonia gas, wherein the supply of ammonia gas is regulated as a function of the hydrogen content of the atmosphere.

It is a still further object of this invention to provide improved apparatus for performing the atmosphere-generating method and carrying out the above-mentioned objects.

An additional object of this invention is to provide apparatus for generating an atmosphere formed partly of nitrogen and hydrogen wherein previously used atmosphere is recycled in a catalyst mass formed of palladium-coated grains of alumina.

Various other objects, advantages and features of this invention will become readily apparent from the forthcoming detailed description, and the novel features will be particularly pointed out in the appended claims.

SUMMARY OF THE INVENTION

In accordance with this invention, both the oxygen-contaminated atmosphere, such as a nitrogen and hydrogen protective reducing atmosphere from an installation, and a fresh nitrogen and hydrogen produced by an ammonia cracking operation, are subjected to a catalytic de-oxidizing treatment which is performed within a temperature range of between 0° and 600° C and which can be initiated, that is, started up, at ordinary temperature, the oxygen-free mixture thus obtained is cooled in order to condense and remove condensable compounds such as water which form during the catalytic treatment, and the final mixture so obtained, is fed as a protective reducing atmosphere into the installation, which may be a heat-treating installation.

As one feature of this method, catalyst of a known type is used which operates over a temperature range that is wider than the operating temperature range of wire-gauze sheets used in previous methods. The catalyst used with this method may even operate at ambient temperature. In addition, the catalytic reaction need not take place in a special enclosure such as a heat-insulated chamber associated with an ammonia burner as was used in prior methods. Also, the fact that the catalytic reaction starts at ordinary temperature obviates the need for pre-heating. Hence, the present method is highly flexible in its operation and relatively easy to carry out in comparison with previous methods.

As another feature of this method the catalytic treatment can take place at a temperature between 0 and 200° C, which is relatively easy to reach and maintain. Advantageously, this relatively low reaction temperature prevents cracking of the oils that may be present in the atmosphere recovered from the installation.

As a further feature of this method, portion of the final mixture obtained after cooling is fed back to by-pass the installation in order to dissipate the heat released by the catalytic reaction and thus make it relatively easy to hold the temperature of catalytic treatment within the desired range.

As another feature of this method, the nitrogen and hydrogen gas produced by the cracking operation and the contaminated atmosphere recovered from the installation are fed via separate channels into the catalyst mass, which takes the form of grains of alumina coated with a layer of palladium, so that they mix within the granular mass of the catalyst. Since the gas produced by cracking and the recovered atmosphere are intoroduced separately in this way, oxygen is removed from the recovered atmosphere as and when mixing takes place and there is thus a swift dispersion of heat. As a result hot areas do not form in the body of the catalyst.

As an additional feature of this method, the hydrogen content of the final atmosphere mixture is continuously measured before the mixture is fed into the installation, and the throughput of ammonia subjected to cracking, and thus the input of the final mixture to the installation, is regulated as a function of this hydrogen content. Consequently, there is constant automatic compensation for the amount of air infiltrating into the installation.

In accordance with another aspect of this invention, apparatus for performing the method is comprised of an infeed duct connected to a source of ammonia under pressure and an outfeed duct which carries off the nitrogen and hydrogen resulting from the cracking of the ammonia; a recovery pipe connected to the output of an installation for recovering contaminated atmosphere which has passed through the installation; a reactor containing a de-oxidizing catalyst has one input connected to the output duct from the cracking arrangement, another input connected to the recovery pipe and an outlet for sypplying an oxygen-free gas mixture; a refrigerating arrangement connected to the outlet of the reactor for removing condensates from the gas mixture to provide an oxygen and moisture-free gas mixture; an input pipe free for supplying the gas mixture from the refrigerating arrangement to the input of the installation; and a device for force-circulating the contaminated atmosphere from the installation and the gas mixture through a closed loop including the reactor, the refrigerating arrangement and the installation.

BRIEF DESCRIPTION OF THE DRAWINGS

The following description, given by way of example, will best be understood in conjunction with the accompanying drawing which is a schematic view of one embodiment of a generator for carrying out the method according to this invention.

DETAILED DESCRIPTION OF A CERTAIN PREFERRED EMBODIMENT

Referring now to the drawings, reference numeral 1 refers to a heat-treating installation such as a metallurgical furnace, which needs to be supplied continuously with a reducing atmosphere intended to protect the items being treated, such as metals or alloys, from oxidation. This reducing atmosphere enters the furnace at entry 1a and emerges at exit 1b containing oxygen contaminant.

The reducing atmosphere is supplied by apparatus which recycles the oxygen-contaminated atmosphere recovered at the exit 1b from installation 1, and which adds an adequate amount of fresh gas, i.e. nitrogen containing hydrogen, to compensate for losses which inevitably take place in the treatment installation, Fresh gas is added by means of an ammonia cracker 10 of a known type, which may be formed by an electrical furnace heated to 900° C and which employs a catalyst using nickel or metals of the nickel group. The cracker 10 is connected, by a supply duct 11, to a source of ammonia 12 where gaseous ammonia is stored at a pressure of 5 to 7 bars. A pressure reducer and regulator 11a, for example a pneumatic valve in supply duct 11, enables ammonia to be supplied from the source 12 to the cracker 10 at a pressure of approximately 1 bar and at a rate which is a function of the extent to which the valve is open. The ammonia is broken down in the cracker 10 into a mixture of nitrogen and hydrogen, or nitrogen containing hydrogen, to be supplied to further apparatus by an outlet duct 13 connected to the outlet of the cracker.

The oxygen with which the atmosphere leaving the furnace 1 is contaminated, as a result of inevitable accidental infiltration of air into the furnace is removed by means of a catalytic reactor 14. Reactor 14 is formed of a sealed enclosure 15 filled with a mass of a catalyst 16 of known type which is formed by grains of alumina coated with a thin layer of palladium. Two concentric conduits, such as tubes, pipes, or the like, form the input to reactor 14, the inner tube 17 being connected to duct 13 to receive the nitrogen and hydrogen produced by the cracker 10 and the external, outer, tube 18 being connected to a recovery pipe 19 to receive the recovered, contaminated atmosphere emerging from exit 1b of the furnace 1. The two tubes 17 and 18 extend into enclosure 15 to approximately half its depth. Thus, the nitrogen and hydrogen gas produced by the cracker 10 and the atmosphere recovered from the furnace 1 are supplied separately to the reactor 14 and are mixed within the granular mass of the catalyst 16. The oxygen contaminant is removed from the recovered atmosphere in a flame-free combustion reaction with the result that one molecule of oxygen combines with two molecules of hydrogen to yield one molecule of water. This reaction is capable of being initiated, or starting up, at ordinary i.e. ambient temperature and is accompanied by the release of heat. Nevertheless, the temperature of the reactor under normal operating conditions is held below 200° C, in a manner explained below.

The oxygen-free gaseous mixture which reaches the outlet 20 of reactor 14 is supplied by a duct 21 to a refrigerating arrangement 22 and more particularly, to an internal coil 23 directly connected to duct 21. Arrangement 22 is supplied with a liquid refrigerant by a duct 24 so that the water formed by the catalytic reaction can be removed from the gaseous mixture. The condensable substances, in particular the water vapour contained in the gaseous mixture from reactor 14, condense during their passage through coil 23 and are removed by a duct 25 connecting the lower end of the coil 23 to a container 26 which also receives, via a duct 27, the excess liquid refrigerant discharged from arrangement 22. Container 26 itself is provided with a discharge duct 28. A pipe 29 connected to the output of coil 23 conveys the gaseous mixture, which now is free of oxygen and of moisture (or at least most of its moisture) to the entry 1a of the installation 1. For those installations where it is required that the gaseous mixture have a very low dew point, on the order of −40° C for example, a drying member 30 may be inserted in pipe 29, as shown in the drawing, to remove all traces of moisture from the mixture.

The nitrogen and hydrogen atmosphere is force-circulated through a closed loop comprised of the installation 1, the reactor 14 and the refrigerating arrangememnt 22 by a motorized compressor 32 disposed, for example, in the recovery pipe 19. The motorized compressor 32 is provided with a bypass 33 having a valve 33a that is adapted to regulate the flow of gas through the system. A flame trap 34 also is disposed in the pipe 19 to prevent explosion in the furnace or the circulation of an explosive mixture. A duct 35 fitted with a valve 35a is connected to the recovery pipe 19 and allows scavenging air to be injected into the furnace when operations begin, such as during start-up of the heat-treatment. Furthermore a bypass 35 fitted with a valve 36a connects the output of refrigerating arrangement 22, via the supply pipe 29, to recovery pipe 19 at a location upstream of compressor 32. The bypass enables part of the cooled, protective reducing atmosphere supplied by the refrigerating arrangement to be fed back to the reactor 14 so as to dissipate the heat released in reactor 14 as a result of the catalytic reaction, if necessary. This dissipation enables the reactor to be held within the selected temperature range, that is to say between 0° and 200° C.

The operation of the generator is controlled by a control system comprised of: a hydrogen analyser 38 of a conventional type which receives, via a duct 39, a sample of the protective reducing atmosphere supplied by pipe 29 to installation 1 and which generates a voltage proportional to the hydrogen content of that atmosphere, a current converter 40 which converts the voltage into a proportional electrical current, and a converter 41 which converts the electical current into a corresponding pressure to control pneumatic valve 11a so as to regulate the flow of ammonia to cracker 10. A recorder 42 may be provided to record the hydrogen contents measured by analyser 38.

When the treatment installation 1 is first put into operation, valve 35a is opened and valve 19a is closed to allow the furnace to be scavenged. When this scavenging operation has been completed, valve 35a then is closed and valve 19a is opened. The motorized compressor 32 then circulates the atmosphere recovered from the furnace, this recovered atmosphere then being recycled in reactor 14 and refrigerating arrangement 22 for re-use by the furnace.

If the temperature in reactor 14 becomes too high, if for example it exceeds 200° C, valve 36a is opened to feed back at least part of the cooled reducing atmosphere to reactor 14 from refrigerating apparatus 22.

The control system 38, 40, 41 allows automatic compensation for air infiltration into the installation 1 by automatically controlling the addition of fresh nitrogen containing hydrogen gas. This infiltration of air results in an increase in the oxygen content of the recovered atmosphere at the exit 1b of the installation 1. The oxygen, when it passes over the catalyst in reactor 14, combines with the hydrogen to lower the $H_2$ content of the reducing atmosphere supplied by the reactor. The reduction in the hydrogen content is immediately detected by analyser 38 which, via current converter 40 and converter 41, operates pneumatic valve 11a to increase the flow of ammonia supplied to cracker 10 from source 12 and thus increase the throughput of cracked gas produced by the cracker. Conversely, if the oxygen content of the recovered atmosphere decreases, then the $H_2$ content of the reducing atmosphere supplied by reactor 14 is raised. This is detected by analyser 38 to control valve 11a to decrease the flow of ammonia to cracker 10.

As a result of the low temperature in reactor 14 the oils which are contained in the recovered atmosphere at the exit from the installation are not cracked and thus do not produce deposits of carbon which otherwise could foul the catalyst.

It should also be noted that with the method described above there is no injection of primary air between cracker 10 and reactor 14 such as is required with the burners used in previous methods.

I claim:
1. A method of supplying an atmosphere formed partly of nitrogen and hydrogen to an installation wherein said atmosphere is subjected to contamination by oxygen, comprising the steps of:
   recovering the contaminated atmosphere from said installation;
   supplying said recovered atmosphere to a catalytic reactor containing palladium-coated grains of alumina for catalytic de-oxidizing at a temperature less than 200° C;
   cooling the de-oxidized atmosphere to remove condensable substances therefrom;
   supplying the cooled de-oxidizing atmosphere to said installation; and
   supplying fresh amounts of nitrogen and hydrogen to said installation as a function of the hydrogen content of said atmosphere.

2. A method according to claim 1 wherein said step of supplying fresh amounts of nitrogen and hydrogen comprises cracking ammonia gas supplied from a source thereof; adding the cracked ammonia gas to said atmosphere; and regulating the amount of ammonia supplied from said source as a function of said hydrogen content of said atmosphere.

3. A method according to claim 2 wherein the step of adding said cracked ammonia gas comprises supplying said cracked ammonia gas to said catalytic reactor separately of said recovered atmosphere; and mixing said supplied cracked ammonia gas and said recovered atmosphere in said catalytic reactor.

4. A method of supplying an atmosphere formed partly of nitrogen and hydrogen to an installation wherein said atmosphere is subjected to contamination by oxygen, comprising the steps of:
- recovering the contaminated atmosphere from said installation;
- supplying said recovered atmosphere to a catalytic reactor containing grains of alumina coated with palladium for catalytic de-oxidizing treatment at a temperature less than 200° C, said catalytic de-oxidizing treatment having a start-up temperature equal to ambient;
- cracking ammonia gas supplied from a source thereof;
- supplying said cracked ammonia gas to said catalytic reactor separately of the supply of said recovered atmosphere thereto;
- mixing said recovered atmosphere and said cracked ammonia gas in said catalytic converter to obtain an oxygen-free mixture;
- cooling said oxygen-free mixture to remove condensable substances therefrom;
- supplying the cooled oxygen-free mixture to said installation;
- regulating the amount of ammonia supplied from said source as a function of the hydrogen content of said oxygen-free mixture; and
- feeding back of portion of said cooled oxygen-free mixture to said catalytic reactor to dissipate heat released by said catalytic de-oxidizing treatment.

5. A method of generating a protective reducing atmosphere comprised of nitrogen and hydrogen for installation for heat-treating items such as metals and alloys, wherein said atmosphere is obtained partly by cracking ammonia and partly by recovering the oxygen-contaminated atmosphere which has already passed through said installation, comprising the steps of feeding said nitrogen and hydrogen obtained by said cracking of ammonia and said recovered oxygen-contaminated atmosphere separately into a mass of catalyst formed of grains of alumina coated with palladium so that said nitrogen and hydrogen mix within the granular mass of the catalyst; subjecting the mixed nitrogen and hydrogen and oxygen-contaminated atmosphere to a de-oxidizing treatment in said catalyst, said de-oxidizing treatment taking place within a temperature range of between 0° and 200° C and being adapted to start up at ambient temperature; refrigerating the oxygen-free mixture produced by the catalytic de-oxidizing treatment so as to condense and remove condensable substances such as water which form during said catalytic treatment; feeding the refrigerated oxygen-free mixture which forms said protective reducing atmosphere to said heat-treating installation; and feeding back a portion of said refrigerated oxtgen-free mixture to said catalyst so as to by-pass said heat-treating installation and dissipate the heat released by the catalytic reaction.

6. A method according to claim 5, wherein the hydrogen content of said oxygen-free mixture is measured continuously before it is fed into said installation, and the amount of ammonia subjected to cracking is regulated as a function of said hydrogen content.

7. A method of generating a protective reducing atmosphere comprised of nitrogen and hydrogen for an installation for heat-treating items such as metals and alloys, wherein said atmosphere is a mixture obtained partly by cracking ammonia and partly be recovering the oxygen-contaminated atmosphere which has already passed through said installation, comprising the steps of subjecting both the contaminated atmosphere and, at the same time, the nitrogen and hydrogen which are obtained by said cracking of ammonia, to a catalytic de-oxidizing treatment which is adapted to be started up at ambient temperature and which is controlled to take place at or less than about 200° C; refrigerating the oxygen-free mixture obtained by said catalytic de-oxidizing treatment so as to condense and remove condensable substances such as water which form during said catalytic treatment; feeding the refrigerated oxygen-free mixture to the heat-treating installation; obtaining a sample of said fed, refrigerated oxygen-free mixture; generating a controlling variable proportional to the hydrogen content of said sampled mixture; and regulating the amount of ammonia which is cracked in accordance with said generated controlling variable.

8. The method of claim 7 wherein the step of regulating the amount of ammonia which is cracked comprises increasing the supply of ammonia to a cracker if the hydrogen content of said sampled mixture decreases, and decreasing the supply of ammonia to the cracker if the hydrogen content of said sampled mixture increases.

9. A method according to claim 7, wherein a portion of said refrigerated oxygen-free mixture is fed back to by-pass the installation and dissipate the heat released by the catalytic reaction.

* * * * *